United States Patent
Wood

(10) Patent No.: US 10,681,018 B2
(45) Date of Patent: *Jun. 9, 2020

(54) TRANSPARENT ENCRYPTION IN A CONTENT CENTRIC NETWORK

(71) Applicant: Cisco Technology, Inc., San Jose, CA (US)

(72) Inventor: Christopher A. Wood, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/113,115

(22) Filed: Aug. 27, 2018

(65) Prior Publication Data

US 2018/0359225 A1    Dec. 13, 2018

Related U.S. Application Data

(63) Continuation of application No. 14/947,810, filed on Nov. 20, 2015, now Pat. No. 10,097,521.

(51) Int. Cl.
*H04L 9/00* (2006.01)
*H04L 29/06* (2006.01)
(Continued)

(52) U.S. Cl.
CPC ........ *H04L 63/0435* (2013.01); *H04L 9/0816* (2013.01); *H04L 9/0847* (2013.01);
(Continued)

(58) Field of Classification Search
CPC .................................................. H04L 63/0435
See application file for complete search history.

(56) References Cited

U.S. PATENT DOCUMENTS

| 817,441 A | 4/1906 | Niesz |
| 4,309,569 A | 1/1982 | Merkle |

(Continued)

FOREIGN PATENT DOCUMENTS

| DE | 1720277 A1 | 6/1967 |
| DE | 19620817 A1 | 11/1997 |

(Continued)

OTHER PUBLICATIONS

Authors: Ali Dabirmoghaddam; Maziar Mirzazad Barijough; Jose Joaquin Garcia-Luna-Aceves, Title: Understanding optimal caching and opportunistic caching at "the edge" of information-centric networks, Sep., 2014 https://dl.acm.org/doi/abs/10.1145/2660129.2660143 (Year: 2014).*

(Continued)

*Primary Examiner* — Jeffrey Nickerson
*Assistant Examiner* — Syed M Ahsan

(57) ABSTRACT

One embodiment provides a system that facilitates efficient and transparent encryption of packets between a client computing device and a content producing device. During operation, the system receives, by a content producing device, an interest packet that includes a masked name which corresponds to an original name, wherein the original name is a hierarchically structured variable length identifier that includes contiguous name components ordered from a most general level to a most specific level. The system obtains the original name based on the masked name. The system computes a symmetric key based on the original name and a generated nonce. The system generates a content object packet that corresponds to the original name and includes the masked name, the nonce, and a payload encrypted based on the symmetric key, wherein the content object packet is received by a client computing device.

20 Claims, 9 Drawing Sheets

(51) Int. Cl.
*H04L 9/08* (2006.01)
*H04L 12/725* (2013.01)
*H04L 29/08* (2006.01)

(52) U.S. Cl.
CPC .......... *H04L 9/0869* (2013.01); *H04L 45/306* (2013.01); *H04L 67/327* (2013.01)

(56) References Cited

U.S. PATENT DOCUMENTS

| | | |
|---|---|---|
| 4,921,898 A | 5/1990 | Lenney |
| 5,070,134 A | 12/1991 | Oyamada |
| 5,110,856 A | 5/1992 | Oyamada |
| 5,506,844 A | 4/1996 | Rao |
| 5,629,370 A | 5/1997 | Freidzon |
| 5,787,431 A | 7/1998 | Shaughnessy |
| 5,870,605 A | 2/1999 | Bracho |
| 6,052,683 A | 4/2000 | Irwin |
| 6,091,724 A | 7/2000 | Chandra |
| 6,173,364 B1 | 1/2001 | Zenchelsky |
| 6,226,618 B1 | 5/2001 | Downs |
| 6,233,646 B1 | 5/2001 | Hahm |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,769,066 B1 | 7/2004 | Botros |
| 6,772,333 B1 | 8/2004 | Brendel |
| 6,862,280 B1 | 3/2005 | Bertagna |
| 6,901,452 B1 | 5/2005 | Bertagna |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,206,860 B2 | 4/2007 | Murakami |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,382,787 B1 | 6/2008 | Barnes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,885 B1 | 5/2011 | Devireddy |
| 8,000,267 B2 | 8/2011 | Solis |
| 8,010,691 B2 | 8/2011 | Kollmansberger |
| 8,074,289 B1 | 12/2011 | Carpenter |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,312,064 B1 | 11/2012 | Gauvin |
| 8,386,622 B2 | 2/2013 | Jacobson |
| 8,467,297 B2 | 6/2013 | Liu |
| 8,553,562 B2 | 10/2013 | Allan |
| 8,572,214 B2 | 10/2013 | Garcia-Luna-Areves |
| 8,654,649 B2 | 2/2014 | Vasseur |
| 8,665,757 B2 | 3/2014 | Kling |
| 8,667,172 B2 | 3/2014 | Ravindran |
| 8,688,619 B1 | 4/2014 | Ezick |
| 8,699,350 B1 | 4/2014 | Kumar |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,862,774 B2 | 10/2014 | Vasseur |
| 8,903,756 B2 | 12/2014 | Zhao |
| 8,937,865 B1 | 1/2015 | Kumar |
| 9,071,498 B2 | 6/2015 | Beser |
| 9,112,895 B1 | 8/2015 | Lin |
| 2002/0010795 A1 | 1/2002 | Brown |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0176404 A1 | 11/2002 | Girard |
| 2002/0188605 A1 | 12/2002 | Adya |
| 2002/0199014 A1 | 12/2002 | Yang |
| 2003/0046437 A1 | 3/2003 | Eytchison |
| 2003/0048793 A1 | 3/2003 | Pochon |
| 2003/0051100 A1 | 3/2003 | Patel |
| 2003/0074472 A1 | 4/2003 | Lucco |
| 2003/0097447 A1 | 5/2003 | Johnston |
| 2003/0140257 A1 | 7/2003 | Peterka |
| 2004/0024879 A1 | 2/2004 | Dingman |
| 2004/0030602 A1 | 2/2004 | Rosenquist |
| 2004/0073715 A1 | 4/2004 | Folkes |
| 2004/0139230 A1 | 7/2004 | Kim |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159323 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |

(56) References Cited

U.S. PATENT DOCUMENTS

| | | |
|---|---|---|
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185677 A1 | 7/2009 | Bugbee |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | vanderLinden |
| 2011/0055392 A1 | 3/2011 | Shen |
| 2011/0055921 A1 | 3/2011 | Narayanaswamy |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0047223 A1 | 2/2012 | Tarkoma |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136676 A1 | 5/2012 | Goodall |
| 2012/0136936 A1 | 5/2012 | Quintana |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0179653 A1 | 7/2012 | Araki |
| 2012/0197690 A1 | 8/2012 | Agulnek |
| 2012/0198048 A1 | 8/2012 | Ioffe |

(56) References Cited

U.S. PATENT DOCUMENTS

| | | |
|---|---|---|
| 2012/0221150 A1 | 8/2012 | Arensmeier |
| 2012/0224487 A1 | 9/2012 | Hui |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0331112 A1 | 12/2012 | Chatani |
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0198119 A1 | 8/2013 | Eberhardt, III |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0250809 A1 | 9/2013 | Hui |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2013/0336323 A1 | 12/2013 | Srinivasan |
| 2013/0343408 A1 | 12/2013 | Cook |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0192717 A1 | 7/2014 | Liu |
| 2014/0195328 A1 | 7/2014 | Ferens |
| 2014/0195666 A1 | 7/2014 | Dumitriu |
| 2014/0233575 A1 | 8/2014 | Xie |
| 2014/0237085 A1 | 8/2014 | Park |
| 2014/0280823 A1 | 9/2014 | Varvello |
| 2014/0281489 A1 | 9/2014 | Petarkia |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0188770 A1 | 7/2015 | Naiksatam |
| 2015/0207633 A1 | 7/2015 | Ravindran et al. |
| 2017/0149747 A1 | 5/2017 | Wood |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2124415 A2 | 11/2009 |
| EP | 2214357 A1 | 8/2010 |
| EP | 2905924 A1 | 8/2015 |
| EP | 2905933 A1 | 8/2015 |
| WO | 2011049890 A1 | 4/2001 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |

OTHER PUBLICATIONS

Authors: Matthias Herlich, Holger Karl, Title: Optimizing Energy Efficiency for Bulk Transfer Networks, 2010 https://cs.uni-paderborn.de/fileadnnin/infornnatik/fg/cn/Publications_Unrefereed_Publications/Optimizing.pdf (Year: 2010).*

Authors: Chalermek Intanagonwiwat, Ramesh Govindan, Deborah Estrin, Title: Directed diffusion: a scalable and robust communication paradigm for sensor networks, Aug., 2000 https://dlacm.org/doi/abs/10.1145/345910.345920 (Year: 2000).*

Authors: Priya Mahadevan, Ersin Uzun, Spencer Sevilla, J. J. Garcia-Luna-Aceves, Title: CCN-KRS: a Key Resolution Service for CCN, 2014 https://conferences.sigcomm.org/acm-icn/2014/papers/p97.pdf (Year: 2014).*

Extended European Search Report in counterpart European Application No. 16197442.3, dated Apr. 5, 2017, 9 pages.

Office Action in counterpart European Application No. 16197442.3, dated Mar. 28, 2018, 7 pages.

Menezes, et al., "Chapter 10: Identification and Entity Authentication," Handbook of Applied Cryptography, Oct. 1996, 41 pages.

B. Algren et al., 'A Survey of Information-centric Networking' IEEE Commun. Magazine, Jul. 2012, pp. 26-36.

Content Centric Networking Project (CCN) [online], http://ccnx.org/releases/latest/doc/technical/, Downloaded Mar. 9, 2015.

Content Mediator Architecture for Content-aware Networks (COMET) Project [online], http://www.comet-project.org/, Downloaded Mar. 9, 2015.

Detti, Andrea, et al. "CONET: a content centric inter-networking architecture." Proceedings of the ACM SIGCOMM workshop on Information-centric networking. ACM, 2011.

Gupta, Anjali, Barbara Liskov, and Rodrigo Rodrigues, "Efficient Routing for Peer-to-Peer Overlays." NSDI, vol. 4. 2004.

Hoque et al., 'NLSR: Named-data Link State Routing Protocol', Aug. 12, 2013, ICN 2013, pp. 15-20.

V. Jacobson et al., 'Networking Named Content,' Proc. IEEE CoNEXT '09, Dec. 2009.

L. Wang et al., 'OSPFN: Am OSPF Based Routing Protocol for Named Data Networking,' Technical Report NDN-0003, 2012.

NDN Project [online], http://www.named-data.net/, Downloaded Mar. 9, 2015.

"Pursuing a pub/sub internet (PUSUIT)," http://www.fp7-pursuit.ew/PursuitWeb/, downloaded Mar. 11, 2015.

Scalable and Adaptive Internet Solutions (SAIL) Project [online], http://sail-project.eu/ Downloaded Mar. 9, 2015.

Xylomenos, George, et al. "A survey of information-centric networking research." Communications Surveys & Tutorials, IEEE 16.2 (2014): 1024-1049.

(56) References Cited

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.
Koponen, Teemu et al., "A Data-Oriented (and Beyond) Network Architecture", SIGCOMM '07, Aug. 27-31, 2007, Kyoto, Japan, XP-002579021, p. 181-192.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attach and countermeasures in Named Data Networking." IFIP Networking Conference. 2013. IEEE, 2013.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking |Feb. 2009).
"PBC Library-Pairing-Based Cryptography-About," http://crypto.stanford.edu/pbc. downloaded Apr. 27, 2015.
Bari, MdFaizul, et al, 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L Wolf 'A routing scheme for content-based networking.' INFOCOM 2004. Twenty-third Annual Joint Conference of the IEEE Computer and Communications Societies. vol. 2 IEEE, 2004.
Cho, Jin-Hee, Ananthram Swami, and Ray Chen. "A survey on trust management for mobile ad hoc networks." Communications Surveys & Tutorials, IEEE 13.4 (2011):562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framwork for service-oriented environments." Proceedings of the 18th international conference on World wide web. ACM, 2009.
Boneh et al., "Collusion Resistant Broadcast Encryption With Short Ciphertexts and Private Keys", 2005.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations,' Information Processing Letters 11.1 (1980): 1-4.
Dijkstra, Edsger W., Wim HJ Feijen and A_J M. Can Gasteren. "Derivation of a termination detection algorithm for distributed computations," Control Flow and Data Flow concepts of distributed programming. Springer Berlin Heidelberg. 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbkhsh, S. K., Lin, Y. Tootoonchian, A., Ghodai, A., Koponen, T., Maggs. B., & Shenker, S. (Aug. 2013) Less pain, most of the gain, Incrementally deployable ICN. In ACM SIGCOMM Computer Communication Review (vol. 43, No. 4, pp. 147-158). ACM.
Anteniese et al., "Improved Proxy Re-Encryption Schemes with Applications to Secure Distributed Storage", 2006.
G. Tyson, S. Kaune, S. Miles, Y. El-Khatib. A. Mauthe, and A. Taweel, "A trace-driven analysis of caching in content-centric networks," In Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services,"In Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system."Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, Gene Tsudik, and Ersin Uzun. "Needle in a Haystack: Mitigating Content Poisoning in Namad-Data Networking." Proceedings of NDSS Workshop on Security of Emerging Networking Technologies (SENT). 2014.
Ghodsi, All, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Xuiong et al., "CloudSeal: End-to-End Content Protection in Cloud-based Storage and Delivery Services", 2012.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maitenance Measures in the Field." ASHRAE Transactions 118.Part 2 {2012).
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Secutiry & Privacy 2007, Berkeley, CA, USA, May 2007, pp. 321-334.

(56) References Cited

OTHER PUBLICATIONS

J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Science vol. 5443 (2009).
Jacobson, Van et al. 'VoCCN: Voice Over Content-Centric Networks.' Dec. 1, 2009. ACM ReArch'09.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-cipertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II," HVAC&R Research 11.2 (2005): 169-187.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networkd: Best practices." Computer Communications 33.9 (2010): 1086-1093.
Gopal et al. "Integrating content-based Mechanisms with hierarchical File systems", Feb. 1999, University of Arizona, 15 pages.
M. Green and G. Ateniese, "Identity-based proxy re-encryption," Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," In Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkingson, A. Rusch, and M. Scott, "PKCS#12: Personal information exchange syntaz v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Utangling the web from DNS," in Proc. USENIX NSDI 2004, Oct. 2010, pp. 735-737.
Mahadevan, Priya, et al. "Orbis: rescaling degree correlations to generate annotated internet topologies," ACM SIGCOMM Computer Communication Review, vol. 37. No. 4. ACM, 2007.
Mahadevan Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43 3 (1998): 207-221.
Matteo Varvello et al., "Caesar: A Content Router for High Speed Forwarding", ICN 2012, Second Edition on Information-Centric Netorking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing newtorks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE-A General Framework for Stochastic and Hybrid Modelbased Diagnosis." Proc. DX (2007): 162-169.
Omar, Mawloud, Yacine Challai, and Abdelmadjid Bouabdallah. "Certification-based trust models in mobile ad hoc networks: A survey and taxonomy." Journal of Newtwork and Computer Applications 35.1 (2012): 268-286.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
Rosenberg, J. "Interactive Connectivity Establishment (ICE): A Protocol for Network Address Translator (NAT) Traversal for Offer/Answer Protocols", Apr. 2010, pp. 1-117.
S. Chow, J. Weng, Y. Yang, and R. Deng. Efficient Unidirectional Proxy Re-Encryption. Progress in Cryptoloty—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "Easier: Encryption-based access control in social network with efficient revocation," in Proc. ACM ASIACCS 2011, Hong Kong, China, Mar. 2011, pp. 411-415.
S. Kamara and K. Lauter, "Cryptographis cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/ Phenomenal H 2012/Sandvine Global Internet Phenomena Report 1H 2012.pdf.
Schein, Jeffrey, and Steven T. Burhby. A Simulation Study of Hierarchicall Rule-Based Method for System-Level Fault Detection and Diagnostics in HVAC Systems, US Department of Commerce. [Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shih, Eugene et al., 'Wake on Wireless: An Event Driven Energy Saving Strategy for Battery Operated Devices', Sep. 23, 2002, pp. 160-171.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challanged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B. G. Chun, A. Ermolinskiy, K.H. Kim, S. Shenker, and I. Sroica, 'A data oriented (and beyond) network

(56) References Cited

OTHER PUBLICATIONS architecture.' ACM SIGCOMM Computer Communication Review, vol. 37, No. 4, pp. 181-192, Oct. 2007.
The Despotify Project (2012). Available online at http://despotify.sourceforge.net/.
V. Goyal, O. Pandey, A. Sahai, and B. Waters, "Attribure based encryption for fine-grained access control of encrypted data," in Proc. ACM CCS 2005. Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Miniconference (2012).
Verma, Vandi, Joquin Fernandez, and Reid Simmons, "Probabilistic models for monitoring and fault diagnosis." The Second IARP and IEEE/RAS Joint Workshop on Technical Challenges for Dependable Robots in Human Environments, Ed. Raja Chatila, Oct. 2002.
Vijay Kumar Adhikari, Yang Guo, Fang Hao, Matteo Varvello, Volker Hill, Moritz Steiner, and Zhi-Li Zhang. Unreeling Netflix: Understanding and Improving Multi-CON Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Yi, Cheng, et al. 'A case for stateful forwarding plane.' Computer Communications 36.7 (2013): 779-791.
Yi, Cheng, et al. 'Adaptive forwarding in named data networking.' ACM SIGCMM computer communication review 42.3 (2012): 62-67.
Zahariadis, Theodore, et al. "Trust management in wireless sensor networks." Eurpean Transactions on Telecommunications 21.4 (2010): 386-395.
Zhang, et al., "Named Data Networking (NDN) Project", http://www.parc.com./publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014}: 66-73.
Soh et al., "Efficient Prefix Updates for IP Router Using Lexicographic Ordering and Updateable Address Set", Jan. 2008, IEEE Transaction on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network and Computer Applications 35 (2012) 221-229.
D. Trossen and G. Parisis, "Designing and realizing and informaton-centric internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCN), Aug. 2013, pp. 1-7.
Ishiyama, "On the Effectiveness of diffusive Content Caching in Content-Centric Networking", Nov. 5, 2012, IEEE, Information and Telecommunications Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
J. Lotspiech, S. Nusser, and F. Pestoni. Anonymous Trust: Digit.
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryprographic Cloud Storage. Financial Cryptography and Data Security. Springer Berlin Heidelberg (2010).
RTMP (2009). Available online at http://wwwimages.adobe.com/www.adobe.com/content/dam/Adobe/en/devnet/tlmp/ pdf/rtmp specification 1.0.pdf.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Amadeo et al. "Design and Analysis of Transport-Level Solution for Content-Centric VANETs", University "Mediterranea" Reggio Calabria, Jun. 15, 2013.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).

\* cited by examiner

TRANSPARENT ENCRYPTION IN A CONTENT CENTRIC NETWORK

CROSS-REFERENCE TO RELATED APPLICATION

This application is a continuation of and claims benefit to U.S. patent application Ser. No. 14/947,810, entitled "TRANSPARENT ENCRYPTION IN A CONTENT CENTRIC NETWORK", filed on 20 Nov. 2015, the entirety of which is incorporated herein by reference.

BACKGROUND

Field

This disclosure is generally related to distribution of digital content. More specifically, this disclosure is related to a system for efficient and transparent encryption of content in a content centric network.

Related Art

The proliferation of the Internet and e-commerce continues to create a vast amount of digital content. Content centric network (CCN) architectures have been designed to facilitate accessing and processing such digital content. A CCN includes entities, or nodes, such as network clients, forwarders (e.g., routers), and content producers, which communicate with each other by sending interest packets for various content items and receiving content object packets in return. CCN interests and content objects are identified by their unique names, which are typically hierarchically structured variable length identifiers (HSVLI). An HSVLI can include contiguous name components ordered from a most general level to a most specific level.

A CCN data packet (such as an interest or content object) is routed based on its name. Part of the CCN name can be used for routing purposes, and part of the name can contain sensitive data. For example, some name components may be used by an intermediate node to perform forwarding and caching, while other name components may contain private user information or application-specific data. In the latter case, the meaningfulness of the name components may reveal information regarding the requested content and may result in a breach of user privacy or security. In addition, CCN communication may require more than one round trip time ("RTT") to exchange content and authentication or key exchange information. These issues can affect the security and efficiency of content distribution in a CCN.

SUMMARY

One embodiment provides a system that facilitates efficient and transparent encryption of packets between a client computing device and a content producing device. During operation, the system receives, by a content producing device, an interest packet that includes a masked name which corresponds to an original name, wherein the original name is a hierarchically structured variable length identifier that includes contiguous name components ordered from a most general level to a most specific level. The system obtains the original name based on the masked name. The system computes a symmetric key based on the original name and a generated nonce. The system generates a content object packet that corresponds to the original name and includes the masked name, the nonce, and a payload encrypted based on the symmetric key, wherein the content object packet is received by a client computing device.

In some embodiments, the system forwards the content object packet to an entity that sent the interest packet.

In some embodiments, the interest packet indicates the original name encrypted based on a public key of the content producing device. The system decrypts the encrypted original name based on a private key of the content producing device.

In some embodiments, the system looks up the masked name in a data structure to obtain the original name.

In some embodiments, the system generates the nonce, which is a random number that has a length of a predetermined size, wherein the symmetric key has a length of a same size as the predetermined size for the generated nonce.

In some embodiments, the method is performed by an application associated with the content producing device or by a component of a stack of communication modules associated with the content producing device.

In another embodiment, the system computes, by a client computing device, a masked name based on an original name, wherein the original name is a hierarchically structured variable length identifier that includes contiguous name components ordered from a most general level to a most specific level. In response to transmitting an interest packet with the masked name, the system receives a content object packet that includes the masked name, a nonce, and a payload encrypted based on a symmetric key, wherein the content object is generated by a content producing device. The system looks up the masked name in a data structure to obtain the original name. The system computes the symmetric key based on the obtained original name and the nonce, and decrypts the encrypted payload based on the symmetric key, thereby facilitating efficient and transparent content encryption between the client computing device and the content producing device.

In some embodiments, computing the masked name is further based on a hash function performed on one or more name components of the original name.

In some embodiments, the system sets the name for the interest packet to the masked name, and stores in a data structure a relation between the masked name and the original name.

In some embodiments, the system encrypts the original name based on a public key of a content producing device. The system includes the encrypted original name in a payload for the interest packet.

In some embodiments, computing the symmetric key is further based on a key derivation function indicated in the content object packet.

In some embodiments, the system replaces the masked name in the content object packet with the obtained original name, and replaces the encrypted payload in the content object packet with the decrypted payload. The system also removes from a pending interest table an entry corresponding to the obtained original name.

BRIEF DESCRIPTION OF THE FIGURES

In the figures, like reference numerals refer to the same figure elements.

DETAILED DESCRIPTION

Figure 1:
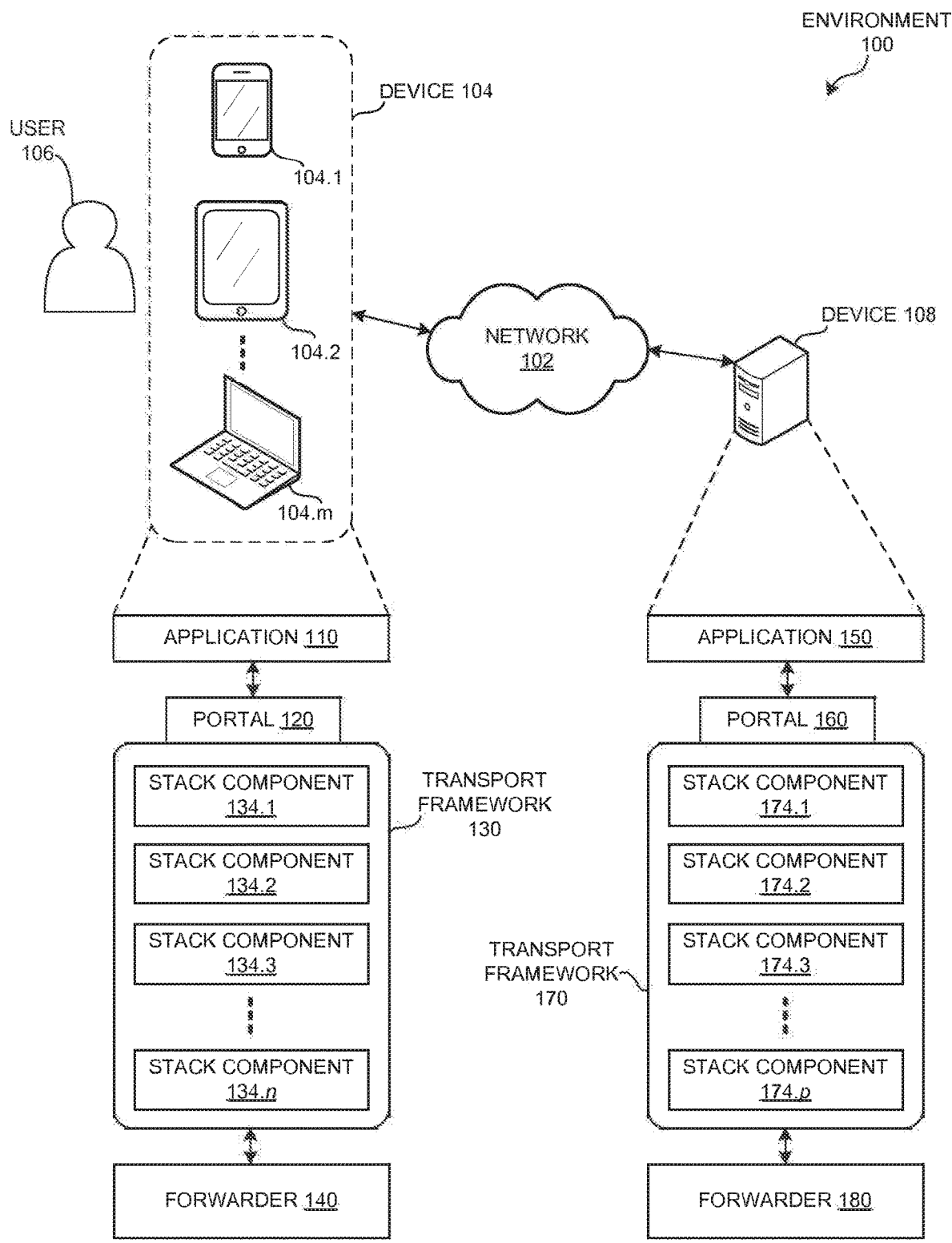
FIG. 1 illustrates an exemplary environment which facilitates efficient and transparent encryption in a content centric network, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system for efficient and transparent encryption of content which solves the problem of malicious access to the content by using a transparent encryption protocol that masks both the name and the content. In CCN, packets are routed based on a unique name for the packet. The CCN name may include application-sensitive data, which can be intercepted by a malicious network entity and result in a breach of user security or privacy. In addition, communication in a CCN between a consumer and a producer may require more than one RTT. For example, in response to an interest, a consumer may receive from a producer an encrypted content object. The consumer may then need to query the producer for key exchange information in order to decrypt the received content, which results in two RTTs.

Embodiments of the present invention provide a system based on a transparent encryption protocol which is both efficient and secure. The system reduces packet travel time to one RTT by masking the name and encrypting the responsive content. At a high level, a consumer creates an interest with an original name ("N") and subsequently masks the name by, e.g., performing a hash function on one or more name components of the name ("H(N)"). The consumer stores the relation between N and H(N). The consumer can optionally encrypt N based on the public key of the producer and include the encrypted original name in the interest. Upon receiving the masked and optionally encrypted interest, the producer determines the original name based on the masked name by either looking up the masked name in a local database or, if the consumer included the encrypted original name in the interest, decrypting the original name based on a private key of the producer.

Subsequently, the producer generates a random nonce ("r"), and then generates a symmetric key ("SK") based on a key derivation function ("KDF") performed on the original name N concatenated with the nonce r: $SK \leftarrow KDF(N\|r)$. The producer then returns a content object with the masked name H(N), the nonce r, and a payload encrypted based on the symmetric key ("$E_{SK}(PAYLOAD)$").

Upon receiving the masked and encrypted responsive content object, the consumer looks up the masked name in its local database (as previously stored) to obtain the original name N, and, in possession of both the original name N and the nonce r, generates the symmetric key in the same manner as the producer: $SK \leftarrow KDF(N\|r)$. The KDF function name and parameters may be included in the content object. The consumer then uses the symmetric key to decrypt the encrypted payload: PAYLOAD $D_{SK}(E_{SK}(PAYLOAD))$.

Thus, only an entity in possession of the original name, the mapping between the original name and the masked name, and the random nonce can generate the symmetric key to decrypt the encrypted payload of the responsive content object. The transparent encryption protocol of the present system thus enables lightweight end-to-end security by masking the name and encrypting the content. The consumer and the producer share a secret which is based on knowledge of the original name and the mapping of the original name to the masked name. In some embodiments, the encryption protocol is based on the functionality of components within and associated with a CCN transport framework, such as a masker component in a CCN transport stack. CCN transport stacks and CCN stack name and identity management are described in U.S. patent application Ser. No. 14/746,490. A detailed description of the transparent encryption protocol is described below in relation to FIG. 2.

In CCN, each piece of content is individually named, and each piece of data is bound to a unique name that distinguishes the data from any other piece of data, such as other versions of the same data or data from other sources. This unique name allows a network device to request the data by disseminating a request or an interest that indicates the unique name, and can obtain the data independent from the data's storage location, network location, application, and means of transportation. The following terms are used to describe the CCN architecture:

Content Object (or "Content Object"):

A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names:

A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document.

In some embodiments, the name can include an identifier, such as a hash value that is derived from the Content Object's data (e.g., a checksum value) and/or from elements of the Content Object's name. A description of a hash-based name is described in U.S. patent application Ser. No. 13/847,814, which is herein incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest (or "Interest"):

A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

The methods disclosed herein are not limited to CCN networks and are applicable to other architectures as well. A description of a CCN architecture is described in U.S. patent application Ser. No. 12/338,175, which is herein incorporated by reference.

Exemplary Network and Communication

FIG. 1 illustrates an exemplary environment 100 which facilitates efficient and transparent encryption in a content centric network, in accordance with an embodiment of the present invention. Computing environment 100 can include a computer network 102, such as a CCN. Environment 100 can also include a user 106 associated with a local computing device 104, and a remote computing device 108. Devices 104 and 108 can have internal transport stacks (e.g., associated with transport frameworks 130 and 170, respectively) that exchange network packets with each other over network 102.

In a traditional IP architecture, a forwarder is an IP-based forwarder that looks at the header of a packet to determine the source and the destination for the packet, and forwards the packet to the destination. The stack performs TCP/UDP, and an application interacts with the stack via a socket. In contrast, device 104 of the present invention does not use a conventional "stack." Rather, device 104 via an application 110 can request a portal API instance corresponding to a portal 120 which corresponds to transport framework 130. Similarly, device 108 via an application 150 can request a portal API instance corresponding to a portal 160 which corresponds to transport framework 170.

Device 104 can include any computing device coupled to network 102, such as a smartphone 104.1, a tablet computer 104.2, and/or a server or personal computer 104.m. Specifically, device 104 can include application 110 which communicates via portal 120 with transport framework 130. Transport framework 130 can include stack components 134.1-134.n. Device 104 can also include forwarder 140 (e.g., a network interface card, or a router in a local area network) which can transfer packets between a stack (and individual stack components) of transport framework 130 and network 102. Similarly, device 108 can include any computing device coupled to network 102, such as a server or an end host device. Device 108 can include application 150 which communicates via portal 160 with transport framework 170. Transport framework 170 can include stack components 174.1-174.p. Device 108 can also include a forwarder 180 which can transfer packets between a stack (and individual stack components) of transport framework 170 and network 102. Forwarders 140 and 180 can also facilitate the transfer of packets directly between individual stack components 134.1-134.n and 174.1-174.p, respectively.

Figure 2:
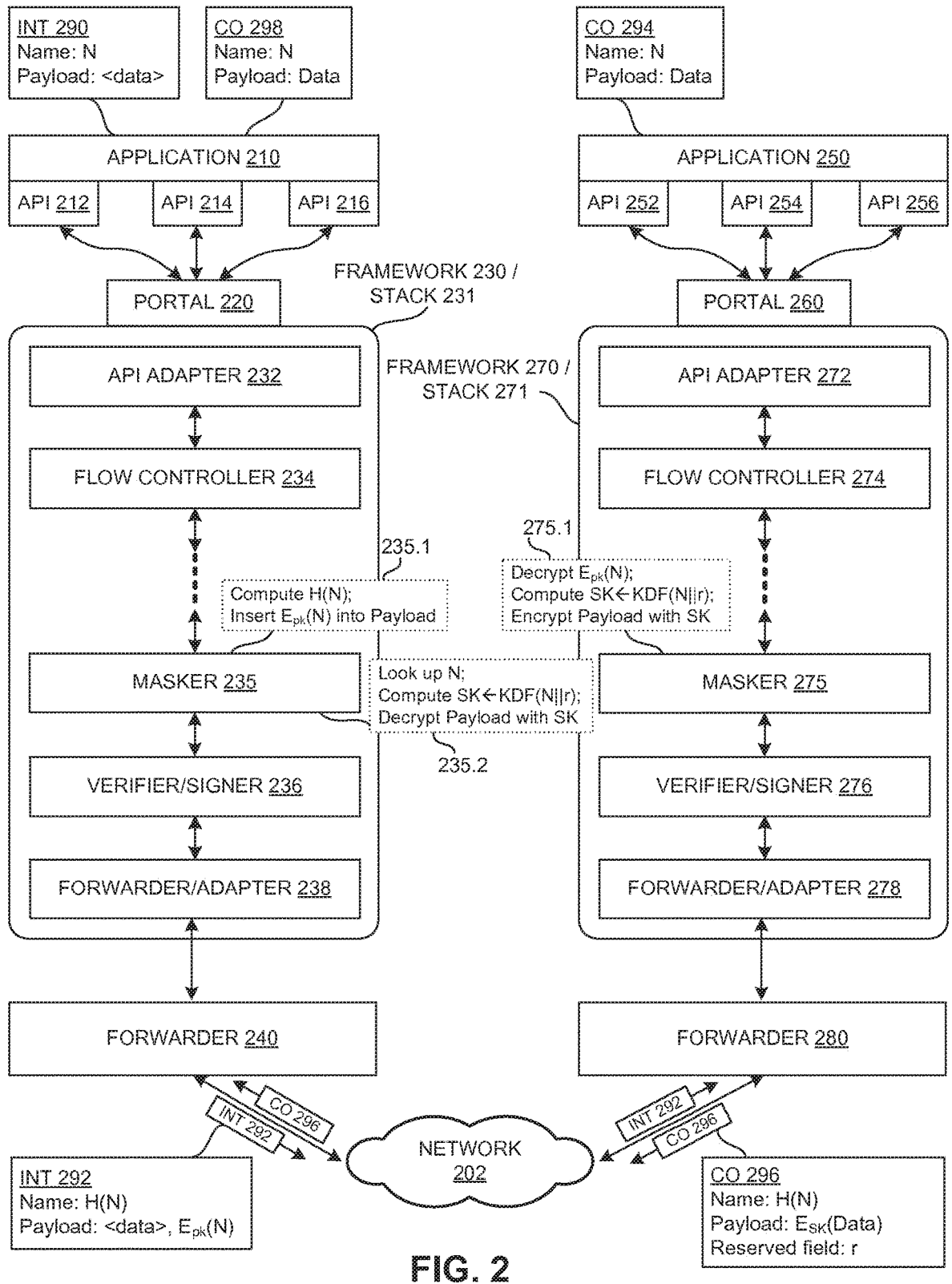
FIG. 2 illustrates an exemplary transport framework which facilitates efficient and transparent encryption in a content centric network, in accordance with an embodiment of the present invention.

FIG. 2 illustrates an exemplary transport framework which facilitates efficient and transparent encryption in a content centric network, in accordance with an embodiment of the present invention. Applications 210 and 250 can reside on the same device or on difference devices which communicate via a network 202. Application 210 can us APIs 212, 214, and 216 to communicate over network 202, and APIs 212-216 can interact via a portal 220 with a transport framework 230. Transport framework 230 can include one or more transport stacks which each include multiple stack components or communication modules. In FIG. 2, transport framework 230 depicts one transport stack (e.g., a transport stack 231) which includes stack components 232, 234, 235, 236, and 238. An API adapter 232 can communicate between an API and a specific transport stack and transport framework 230. A flow controller 234 can shape and manage traffic, pipeline and transmit interests, and order content objects. A masker 235 can create a masked name and perform functions related to transparent encryption, such as storing a mapping between an original name and a masked name, and computing a symmetric key for decrypting a payload. A verifier/signer 236 can encode and sign content objects destined for a network element, decode and verify content objects destined for the application, encode interests destined for a network element, and decode interests destined for the application. A forwarder/adapter 238 can communicate with a forwarder 240. Forwarder 240 can communicate with other forwarders over network 202. Other stack components (not shown) can include functionality related to security (e.g., encryption, decryption, authentication, data signing, signature verification, trust assessment, and filtering), data-processing (e.g., encoding, decoding, encapsulating, decapsulating, transcoding, compression, extraction, and decompression), and storage (e.g., data storage, data retrieval from storage deduplication, segmentation, and versioning).

Similarly, application 250 can use APIs 252, 254, and 256 to communicate over network 202, and APIs 252-256 can interact via a portal 260 with a transport framework 270. Transport framework 270 can include one or more transport stacks which each include multiple stack components or communication modules. In FIG. 2, transport framework 270 depicts one transport stack (e.g., a transport stack 271) which includes the following stack components: an API adapter 272; a flow controller 274; a masker 275; a verifier/signer 276; and a forwarder/adapter 278 which can communicate with a forwarder 280. Forwarder 280 can communicate with forwarder 240 over network 202.

Application 210 can be associated with a consumer or a client computing device, and application 250 can be associated with a producer or a content producing device. During operation, application 210 can create an interest 290 with an original name ("N") and an optional payload ("<data>"). Application 210 can send interest 290, via portal API instance 220, through stack 231. Masker 235 can receive interest 290 and compute the masked name (e.g., "H(N)") (function 235.1) Masker 235 can store a mapping in a local database between N and H(N). In some embodiments, masker 235 can encrypt the original name with the public key of the producer, and insert the encrypted name into the payload of interest 290/292 (function 235.1), which can travel over network 202 via forwarders 240 and 280 (as shown by an interest 292).

Application 250 can receive interest 292 via forwarder 280 and transport stack 271. If the payload includes the encrypted original name, application 250 can decrypt the encrypted original name based on the private key of the producer. Alternatively, if the payload does not include the encrypted original name, application 250 (or one of the stack components) can perform a lookup in a local database for the masked name H(N) to obtain the original name N. In FIG. 2, determining N from H(N) is shown as a decryption operation performed by masker 275 in function 275.1, but this step can also be performed by application 250 or another stack component.

Subsequently, application 250 can generate a responsive content object 294 with the original name N and a payload of "Data." Masker 275 then computes a symmetric key ("SK") by performing a key derivation function ("KDF") using as input the original name N concatenated with a random nonce ("r"). Masker 275 can generate the nonce r, which can be a random string with a length of a predetermined size. The symmetric key SK can also have a length of the same predetermined size SK←KDF(N∥r). Masker 275 can encrypt the payload using the symmetric key SK, replace the original name N with the masked name H(N), include the nonce r in a special field, and replace the cleartext payload with the encrypted payload (as shown in egress content object 296). The payload of content object 296 can include the specific function and other parameters needed to perform the key derivation function. The masked and encrypted content object 296 can travel over network 202 via forwarders 280 and 240.

Forwarder 240 can send content object 296 to transport stack 231. Masker 235 can look up H(N) in its local database with the previously stored mapping to obtain N (function 235.2). Because masker 235 possesses the KDF, the original name N, and the random nonce r, masker 235 can compute the symmetric key in similar fashion as masker 275: SK←KDF(N∥r) (function 235.2). Masker 235 can then decrypt the encrypted payload to obtain "Data" and pass a decrypted, unmasked, and responsive content object 298 back up to application 210. In this way, only an entity that can derive the original name from the masked name can create the symmetric key to access the encrypted payload. Thus the present invention provides a lightweight end-to-end security for content distribution in a CCN.

Note that in FIG. 2, the interest packet created by application 210 and transmitted by forwarder 240 is depicted as two interests (290 and 292) for the sake of illustration. Similar, the responsive content object created by application 250 and transmitted by forwarder 280 is depicted as two content objects (294 and 296) for the sake of illustration.

Client Computing Device Generates a Masked Interest

Figure 3:
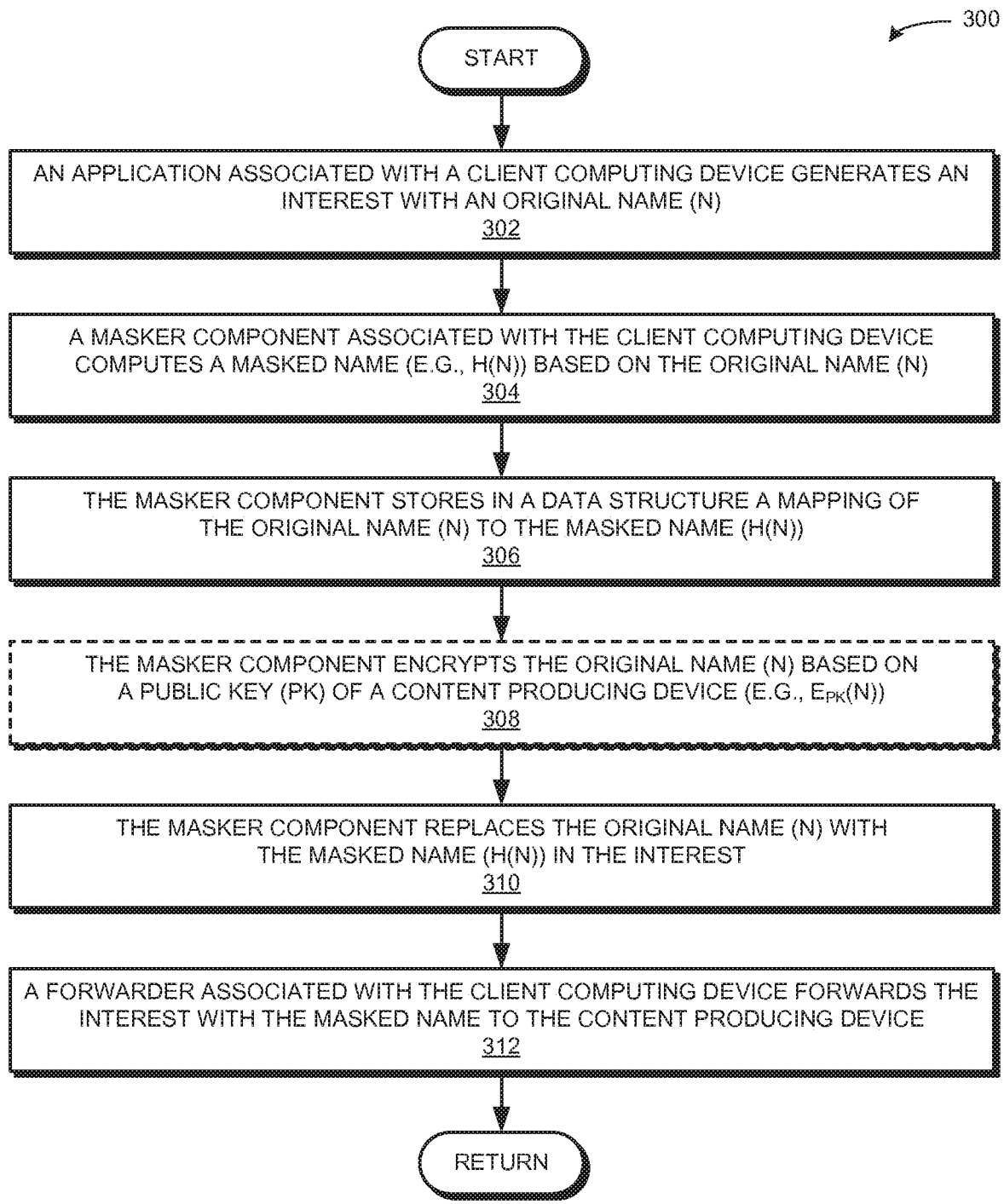
FIG. 3 presents a flow chart illustrating a method by a client computing device for facilitating efficient and transparent encryption in a content centric network, in accordance with an embodiment of the present invention.

FIG. 3 presents a flow chart 300 illustrating a method by a client computing device for facilitating efficient and transparent encryption in a content centric network, in accordance with an embodiment of the present invention. During operation, an application associated with a client computing device generates an interest with an original name N (operation 302). A masker component associated with the client computing device computes a masked name based on the original name (operation 304). For example, the masker component can perform a hash function on the original name N to obtain the masked name H(N). The computation can be based on one or more name components of the original name, as in: H(N)=/H(nc1)/H(nc2)), where "nc1" is the first name component of the original name and "nc2" is the second name component of the original name. The computation can also be based on any combination of name components, as in: H(N)=/H(nc1/nc2)/H(nc3), where "nc3" is the third name component of the original name. Furthermore, the masked name may contain some cleartext name components which are not masked, such as: H(N)=/google/H(nc1)/H(nc2).

The masker component stores in a local data structure a mapping of the original name N to the masked name H(N) (operation 306). The masker component can optionally encrypt the original name based on a public key ("PK") of a content producing device (e.g., ErK(N)), and include or indicate the encrypted original name in the payload (operation 308, depicted with dashed lines). The masker component replaces the original name N with the masked name H(N) in the interest (operation 310). A forwarder associated with the client computing device forwards the interest with the masked name to the content producing device (operation 312).

Content Producing Device Returns a Masked and Encrypted Content Object

Figure 4:
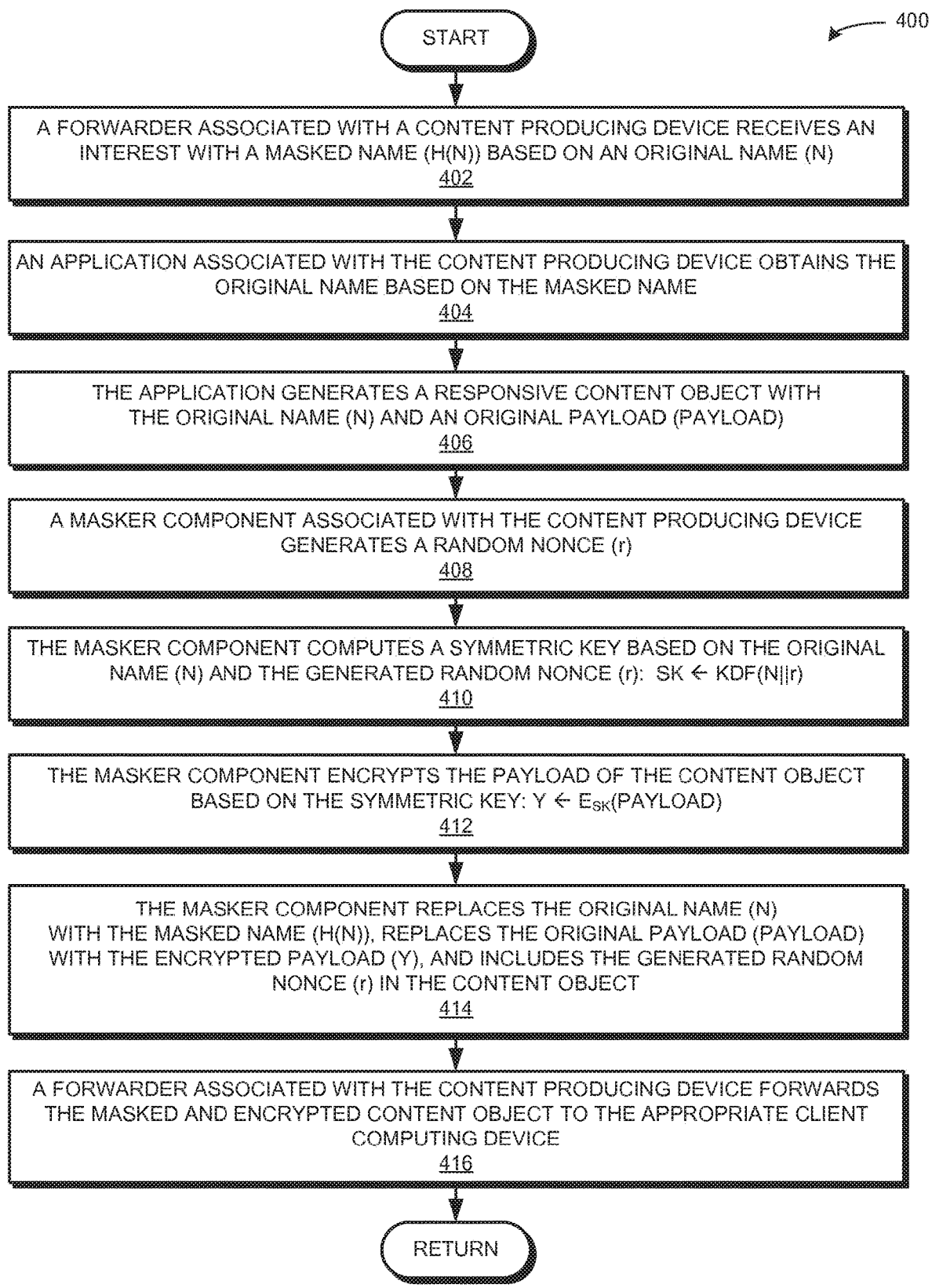
FIG. 4 presents a flow chart illustrating a method by a content producing device for facilitating efficient and transparent encryption in a content centric network, in accordance with an embodiment of the present invention.

FIG. 4 presents a flow chart 400 illustrating a method by a content producing device for facilitating efficient and transparent encryption in a content centric network, in accordance with an embodiment of the present invention. During operation, a forwarder associated with a content producing device (e.g., a producer) receives an interest with a masked name H(N) which is based on an original name N (operation 402). The interest may indicate in the payload the original name encrypted based on the public key of the producer. An application associated with the content producing device obtains the original name based on the masked name (operation 404). For example, if the interest indicates the encrypted original name, the application can decrypt the encrypted original name based on a private key of the producer. As another example, the content producing device may previously store a mapping between the original name and the masked name, e.g., in a local data structure. The content producing device can look up in its local data structure the masked name to obtain the original name.

The application generates a responsive content object with the original name N and an original payload ("PAYLOAD") (operation 406). The content object includes content that corresponds to the original name N. A masker component associated with the content producing device generates a random nonce r (operation 408). The masker component computes a symmetric key SK by performing a key derivation function KDF based on the original name N and the generated nonce r: SK←KDF(N∥r) (operation 410). The nonce can be of lambda bits in length, and the computed symmetric key can also be lambda bits in length. The masker component encrypts the payload of the responsive object based on the symmetric key: Y←$E_{SK}$(PAYLOAD) (operation 412). The masker component replaces the original name N with the masked name H(N), and further replaces the original payload PAYLOAD with the encrypted payload Y (operation 414). The masker component also includes the generated random nonce r in the responsive content object (operation 414). The nonce can be included in the payload or in the packet header or in a special or reserved field. Finally, a forwarder associated with the content producing device forwards the masked and encrypted content object to the appropriate client computing device (operation 416). The masked and encrypted content object is received by the client computing device which sent the interest.

Client Computing Device Processes a Masked and Encrypted Content Object

Figure 5:
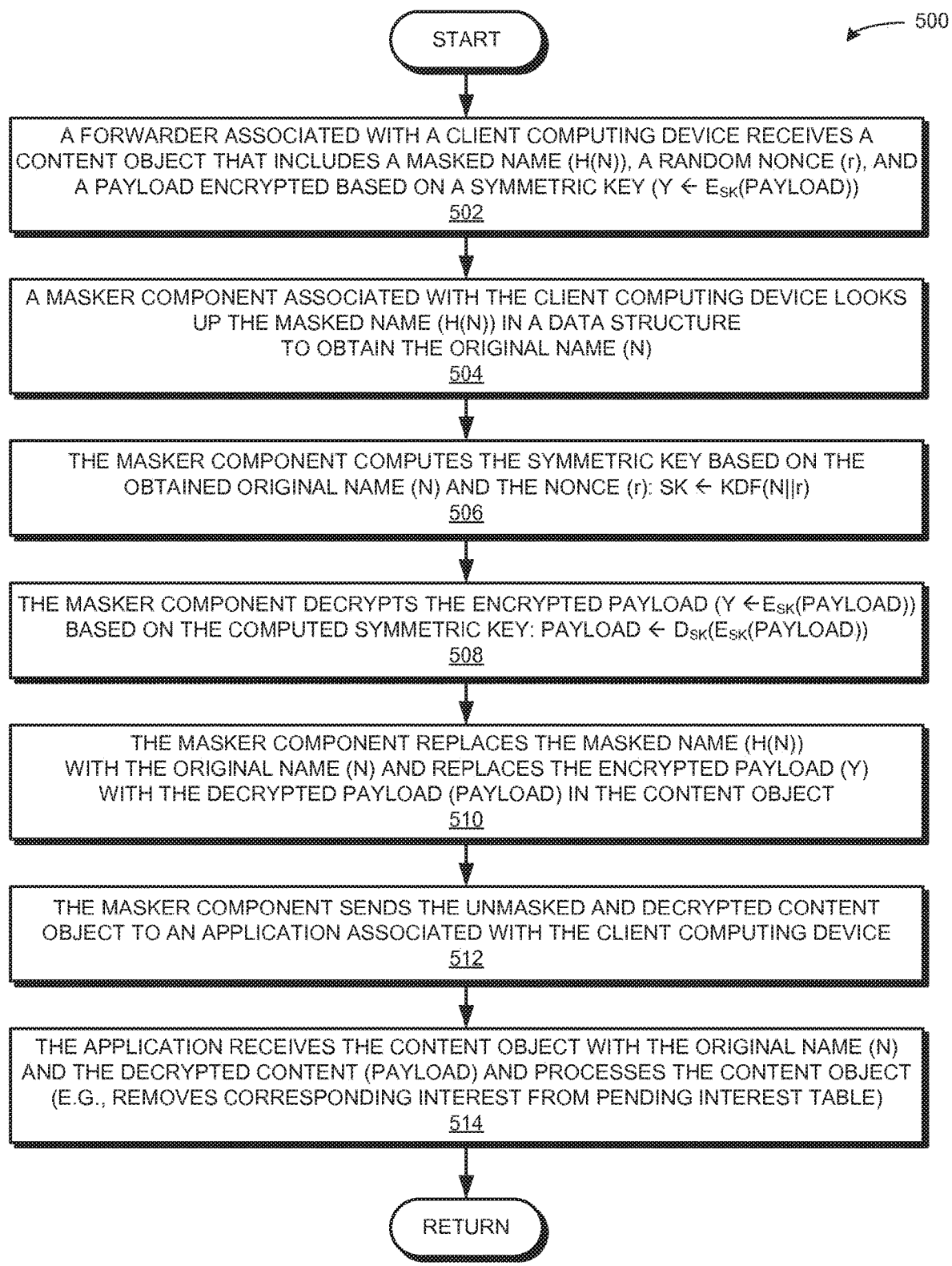
FIG. 5 presents a flow chart illustrating a method by a client computing device for facilitating efficient and transparent encryption in a content centric network, in accordance with an embodiment of the present invention.

FIG. 5 presents a flow chart 500 illustrating a method by a client computing device for facilitating efficient and transparent encryption in a content centric network, in accordance with an embodiment of the present invention. During operation, a forwarder associated with a client computing device receives a content object that includes a masked name H(N), a random nonce r, and a payload encrypted based on a symmetric key SK (e.g., $Y \leftarrow E_{SK}(PAYLOAD)$) (operation 502). Operation 502 may occur upon completion of operations 302-312 of FIG. 3. A masker component associated with the client computing device looks up the masked name H(N) in a local data structure to obtain the original name N (operation 504). The key derivation function KDF and any other required parameters can be included in the content object. The masker component computes the symmetric key SK based on the obtained original name N and the nonce r: $SK \leftarrow KDF(N\|r)$ (operation 506). The masker component decrypts the encrypted payload (e.g., $Y \leftarrow E_{SK}(PAYLOAD)$) based on the computed symmetric key: $PAYLOAD \leftarrow D_{SK}(E_{SK}(PAYLOAD))$ (operation 508). The masker component replaces the masked name H(N) with the original name N, and replaces the encrypted payload Y with the decrypted payload PAYLOAD in the content object (operation 510). The masker component sends the unmasked and decrypted content object to an application associated with the client computing device (operation 512). The application receives the content object with the original name N and the decrypted content PAYLOAD, and processes the content object normally (operation 514). For example, the application can remove the entry corresponding to the fulfilled interest from a pending interest table.

Router Functionality

A CCN router can maintain a Forwarding Information Base ("FIB"), a Pending Interest Table ("PIT"), and a Content Store ("CS"), as described in U.S. patent application Ser. No. 13/847,814, which is herein incorporated by reference. The transparent encryption protocol of the present system does not impact the ability of a router to cache content in the CS, where the content is indexed by its name. Because a consumer can use a standard hash function to create the masked name H(N) from the original name N, other consumers requesting the same content can also create interests with the same masked name based on the standard hash function. Therefore, any consumer with knowledge of the original name N and the nonce r can decrypt the content for upper-layer applications. As described above, the symmetric encryption key SK is computed based on knowledge of the original name N. Because a router cannot reverse the one-way masking function (e.g., H(N)), only an entity with a priori knowledge of the original name N can decrypt the content. The entity with this knowledge is the consumer, which provides end-to-end security for content distributed in a CCN.

In addition, a producer may publish names and route prefixes in their masked form, either in a flat representation or as a sequence of hash digests based on the name structure. The PIT, CS, and FIB may be implemented using data structures like hash tables. Thus, the hash of a name is computed by the router, although the router may use more efficient hash functions such as CityHash or SipHash. In the present system, the consumer provides the hash a priori, which eases the computational burden of the routers (assuming that data structures like hash tables are used for implementing the PIT, CS, and FIB).

Exemplary Apparatuses and Computer Systems

Figure 6A:
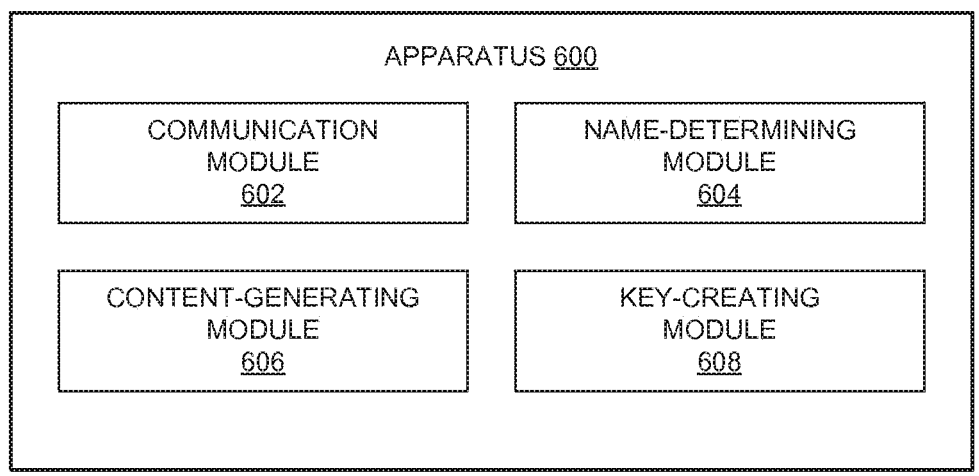
FIG. 6A illustrates an exemplary apparatus that facilitates efficient and transparent encryption in a content centric network, in accordance with an embodiment of the present invention.

FIG. 6A illustrates an exemplary apparatus that facilitates efficient and transparent encryption in a content centric network, in accordance with an embodiment of the present invention. Apparatus 600 can comprise a plurality of modules which may communicate with one another via a wired or wireless communication channel. Apparatus 600 may be realized using one or more integrated circuits, and may include fewer or more modules than those shown in FIG. 6A. Further, apparatus 600 may be integrated in a computer system, or realized as a separate device which is capable of communicating with other computer systems and/or devices. Specifically, apparatus 600 can comprise a communication module 602, a name-determining module 604, a content-generating module 606, and a key-creating module 608.

In some embodiments, communication module 602 can send and/or receive data packets to/from other network nodes across a computer network, such as a content centric network. A data packet can include an interest packet or a content object packet with a masked name which correspond to an original name. Name-determining module 604 can obtain the original name based on the masked name. Key-creating module 608 can compute a symmetric key based on the original name and a generated nonce. Content-generating module 606 can generate a content object packet with content that corresponds to the original name and includes the masked name, the nonce, and a payload encrypted based on the symmetric key. Communication module 602 can forward the content object packet to an entity that sent the interest packet. Name-determining module 604 can decrypt the encrypted original name based on a private key of the content producing device. Name-determining module 604 can also look up the masked name in a data structure to obtain the original name. Key-creating module 608 can generate the nonce.

Figure 6B:
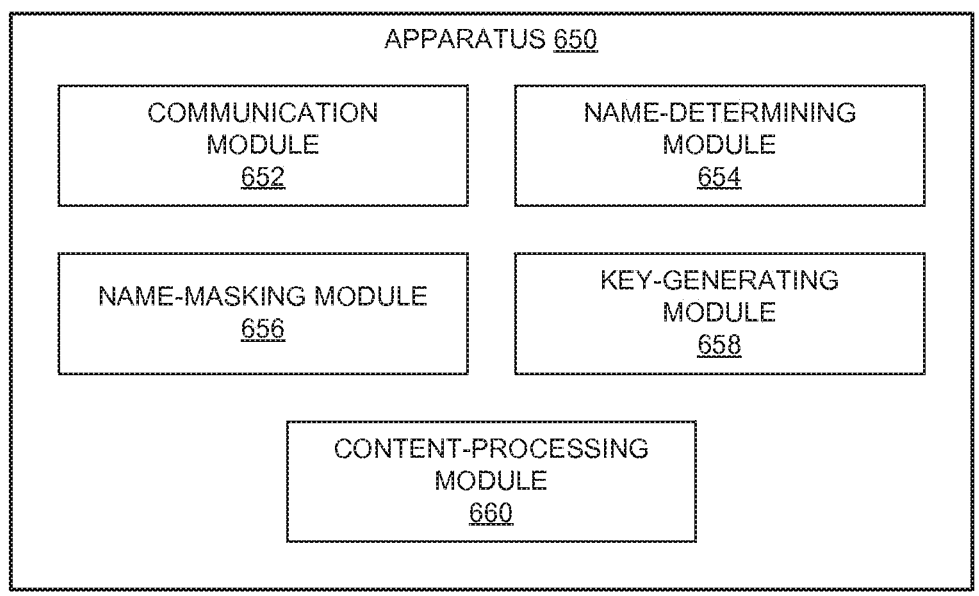
FIG. 6B illustrates an exemplary apparatus that facilitates efficient and transparent encryption in a content centric network, in accordance with an embodiment of the present invention.

FIG. 6B illustrates an exemplary apparatus 650 that facilitates efficient and transparent encryption in a content centric network, in accordance with an embodiment of the present invention. Apparatus 650 can comprise a plurality of modules which may communicate with one another via a wired or wireless communication channel. Apparatus 650 may be realized using one or more integrated circuits, and may include fewer or more modules than those shown in FIG. 6B. Further, apparatus 650 may be integrated in a computer system, or realized as a separate device which is capable of communicating with other computer systems and/or devices. Specifically, apparatus 650 can comprise a communication module 652, a name-determining module 654, a content-generating module 656, a key-creating module 658, and a content-processing module 660.

In some embodiments, communication module 652 can send and/or receive data packets to/from other network nodes across a computer network, such as a content centric network. A data packet can include an interest packet or a content object packet with a masked name which correspond to an original name. Name-masking module 656 can compute a masked name based on an original name. In response to transmitting an interest packet with the masked name, communication module 652 can receive a content object packet that includes the masked name, a nonce, and a payload encrypted based on a symmetric key. Name-determining module 654 can look up the masked name in a data structure to obtain the original name. Key-generating module 658 can compute the symmetric key based on the obtained original name and the nonce. Content-processing module 660 can decrypt the encrypted payload based on the symmetric key.

Content-processing module 660 can also set the name for the interest packet to the masked name and store in a data structure a relation between the masked name and the original name. Content-processing module 660 can further encrypt the original name based on a public key of a content producing device, and include the encrypted original name in a payload for the interest packet. Content-processing module 660 can replace the masked name in the content object packet with the obtained original name, replace the encrypted payload in the content object packet with the decrypted payload, and remove from a pending interest table an entry corresponding to the obtained original name.

Figure 7A:
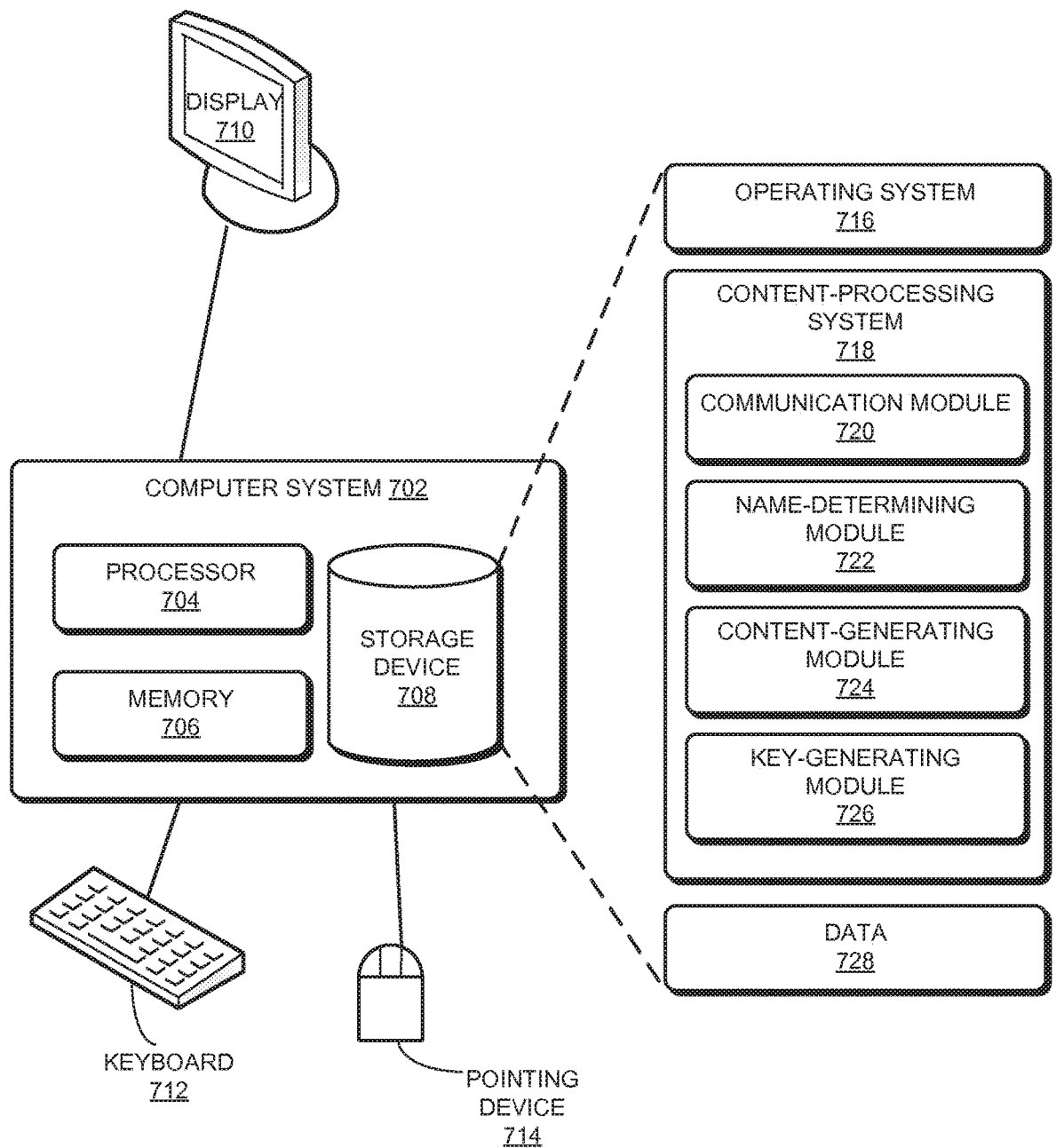
FIG. 7A illustrates an exemplary computer system that facilitates efficient and transparent encryption in a content centric network, in accordance with an embodiment of the present invention.

FIG. 7A illustrates an exemplary computer system 702 that facilitates efficient and transparent encryption in a content centric network, in accordance with an embodiment of the present invention. Computer system 702 includes a processor 704, a memory 706, and a storage device 708. Memory 706 can include a volatile memory (e.g., RAM) that serves as a managed memory, and can be used to store one or more memory pools. Furthermore, computer system 702 can be coupled to a display device 710, a keyboard 712, and a pointing device 714. Storage device 708 can store an operating system 716, a content-processing system 718, and data 728.

Content-processing system 718 can include instructions, which when executed by computer system 702, can cause computer system 702 to perform methods and/or processes described in this disclosure. Specifically, content-processing system 718 may include instructions for sending and/or receiving data packets to/from other network nodes across a computer network, such as a content centric network (communication module 720). A data packet can include an interest packet or a content object packet with a masked name which correspond to an original name. Further, content-processing system 718 can include instructions for obtaining the original name based on the masked name (name-determining module 722). Content-processing system 718 can include instructions for computing a symmetric key based on the original name and a generated nonce (key-creating module 726). Content-processing system 718 can also include instructions for generating a content object packet with content that corresponds to the original name and includes the masked name, the nonce, and a payload encrypted based on the symmetric key (content-generating module 724). Content-processing system 718 can include instructions for forwarding the content object packet to an entity that sent the interest packet (communication module 720).

Content-processing system 718 can additionally include instructions for decrypting the encrypted original name based on a private key of the content producing device (name-determining module 722). Content-processing system 718 can include instructions for looking up the masked name in a data structure to obtain the original name (name-determining module 722). Content-processing system 718 can also include instructions for generating the nonce (key-creating module 726).

Figure 7B:
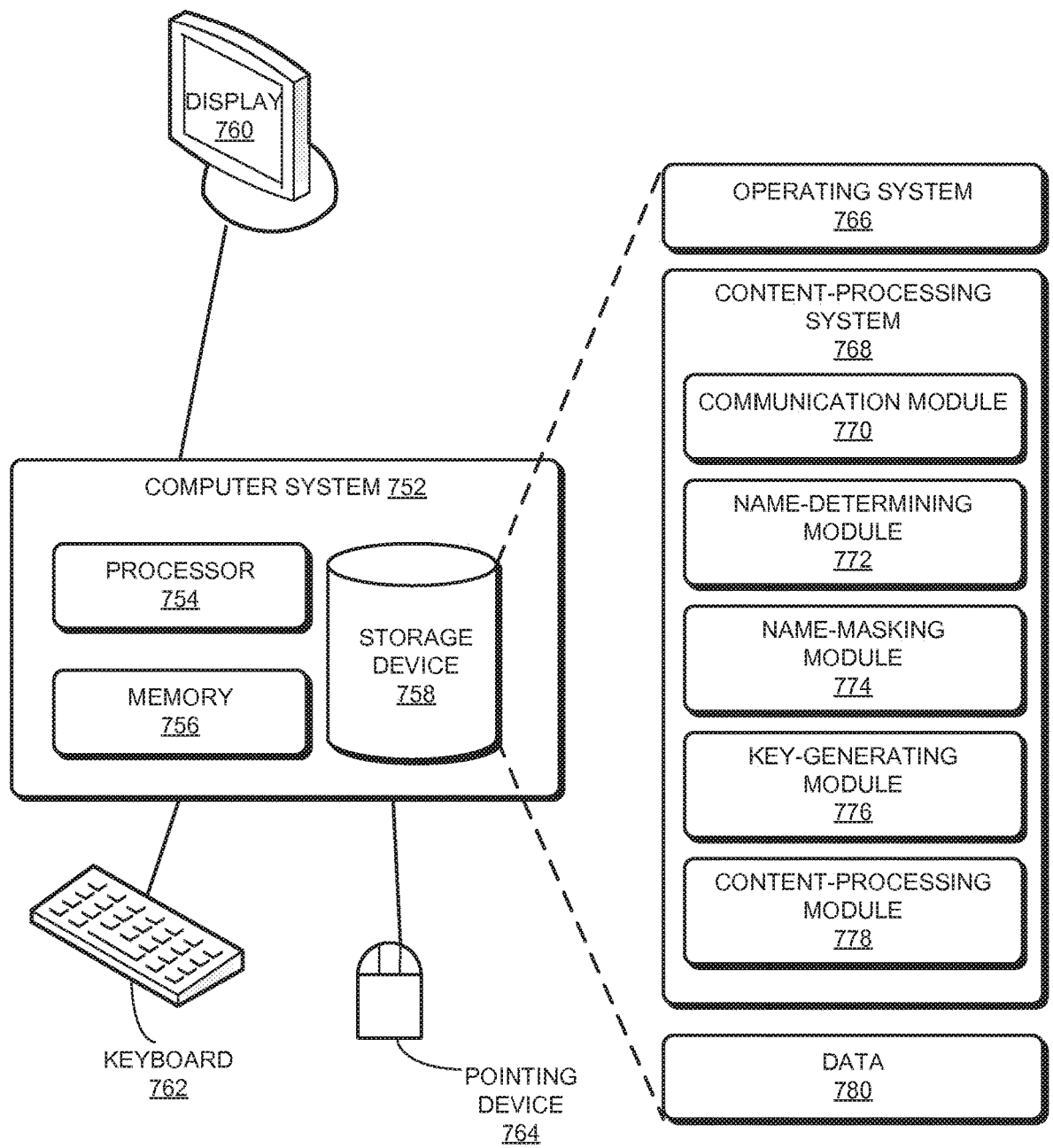
FIG. 7B illustrates an exemplary computer system that facilitates efficient and transparent encryption in a content centric network, in accordance with an embodiment of the present invention.

FIG. 7B illustrates an exemplary computer system 752 that facilitates efficient and transparent encryption in a content centric network, in accordance with an embodiment of the present invention. Computer system 752 includes a processor 754, a memory 756, and a storage device 758. Memory 756 can include a volatile memory (e.g., RAM) that serves as a managed memory, and can be used to store one or more memory pools. Furthermore, computer system 752 can be coupled to a display device 760, a keyboard 762, and a pointing device 764. Storage device 758 can store an operating system 766, a content-processing system 768, and data 780.

Content-processing system 768 can include instructions, which when executed by computer system 752, can cause computer system 752 to perform methods and/or processes described in this disclosure. Specifically, content-processing system 768 may include instructions for sending and/or receiving data packets to/from other network nodes across a computer network, such as a content centric network (communication module 770). A data packet can include an interest packet or a content object packet with a masked name which correspond to an original name. Content-processing system 768 can include instructions for computing a masked name based on an original name (name-masking module 774). Content-processing system 768 can also include instructions for, in response to transmitting an interest packet with the masked name, receiving a content object packet that includes the masked name, a nonce, and a payload encrypted based on a symmetric key (communication module 770). Content-processing system 768 can include instructions for looking up the masked name in a data structure to obtain the original name (name-determining module 772). Content-processing system 768 can additionally include instructions for computing the symmetric key based on the obtained original name and the nonce (key-generating module 776). Content-processing system 768 can include instructions for decrypting the encrypted payload based on the symmetric key (content-processing module 778).

Furthermore, content-processing system 768 can include instructions for setting the name for the interest packet to the masked name and store in a data structure a relation between the masked name and the original name (content-processing module 778). Content-processing system 768 can also include instructions for encrypting the original name based on a public key of a content producing device, and including the encrypted original name in a payload for the interest packet (content-processing module 778). Content-processing system 768 can include instructions for replacing the masked name in the content object packet with the obtained original name, replacing the encrypted payload in the content object packet with the decrypted payload, and removing from a pending interest table an entry corresponding to the obtained original name (content-processing module 778).

Data 728 and data 780 can include any data that is required as input or that is generated as output by the methods and/or processes described in this disclosure. Specifically, data 728 and data 780 can store at least: a name; an original name that corresponds to a masked name; a name that is an HSVLI; a packet that corresponds to an interest, where the interest includes a masked name; a masked name that is computed based on a hash function performed on one or more name components; a transport framework; a protocol or transport stack; one or more components of a transport or protocol stack; a portal instance associated with a transport or protocol stack; a symmetric key; a nonce; a length or a size for the nonce; a key derivation function; a public key and/or a private key of a content producing device; a data structure that stores a relationship between an original name and a masked name; a packet that corresponds to a content object, where the content object includes a masked name and an encrypted payload; and a pending interest table.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for facilitating efficient and transparent encryption of packets, the method comprising:
receiving, by a content producing device, an interest packet that includes a masked name which corresponds to an original name of a content object, wherein the original name is a hierarchically structured variable length identifier, wherein said hierarchically structured variable length identifier represents a location of a specific content object within a file system and is used to identify the specific content object, and wherein the interest packet includes an encrypted original name of the content object in a payload of the interest packet, wherein the original name is encrypted based on a public key of the content producing device to generate the encrypted original name;
obtaining the original name of the content object by decrypting the encrypted original name included in the payload of the interest packet based on a private key of the content producing device;
computing a symmetric key based on both: (1) the original name of the content object, and (2) a generated nonce, wherein the generated nonce is a random string with a length of a predetermined size, and wherein the symmetric key has a length that is equal to the predetermined size of the generated nonce;
generating a content object packet that corresponds to the original name and includes the masked name, the nonce, and a payload including the content object corresponding to the original name, wherein the payload is encrypted based on the symmetric key, wherein the content object packet is received by a client computing device, thereby facilitating efficient and transparent content encryption between the content producing device and the client computing device; and
forwarding the content object packet to an entity that sent the interest packet.

2. The method of claim 1, wherein the original name that corresponds to the masked name is stored in a data structure at the client computing device.

3. The method of claim 1, wherein the masked name is based on a hash function performed on one or more name components of the original name.

4. The method of claim 1, wherein the method is performed by an application associated with the content producing device or by a component of a stack of communication modules associated with the content producing device.

5. The method of claim 1, wherein the generated nonce is included in the payload of the content object packet.

6. The method of claim 1, wherein the generated nonce is included in a packet header of the content object packet.

7. One or more non-transitory computer readable storage media encoded with instructions that, when executed by a processor of a content producing device, cause the processor to:
receive an interest packet that includes a masked name which corresponds to an original name of a content object, wherein the original name is a hierarchically structured variable length identifier, wherein said hierarchically structured variable length identifier represents a location of a specific content object within a file system and is used to identify the specific content object, and wherein the interest packet includes an encrypted original name of the content object in a payload of the interest packet, wherein the original name is encrypted based on a public key of the content producing device to generate the encrypted original name;
obtain the original name of the content object by decrypting the encrypted original name included in the payload of the interest packet based on a private key of the content producing device;
compute a symmetric key based on both: (1) the original name of the content object, and (2) a generated nonce, wherein the generated nonce is a random string with a length of a predetermined size, and wherein the symmetric key has a length that is equal to the predetermined size of the generated nonce;
generate a content object packet that corresponds to the original name and includes the masked name, the nonce, and a payload including the content object corresponding to the original name, wherein the payload is encrypted based on the symmetric key, wherein the content object packet is received by a client computing device, thereby facilitating efficient and transparent content encryption between the content producing device and the client computing device; and
forward the content object packet to an entity that sent the interest packet.

8. The one or more non-transitory computer readable storage media of claim 7, wherein the original name that corresponds to the masked name is stored in a data structure at the client computing device.

9. The one or more non-transitory computer readable storage media of claim 7, wherein the instructions are executed by an application associated with the content producing device or by a component of a stack of communication modules associated with the content producing device.

10. The one or more non-transitory computer readable storage media of claim 7, wherein the generated nonce is included in the payload of the content object packet.

11. The one or more non-transitory computer readable storage media of claim 7, wherein the generated nonce is included in a packet header of the content object packet.

12. The one or more non-transitory computer readable storage media of claim 7, wherein the masked name is based on a hash function performed on one or more name components of the original name.

13. One or more non-transitory computer readable storage media encoded with instructions that, when executed by a processor of a client computing device, cause the processor to:
   encrypt an original name of a content object to generate an encrypted original name, wherein the original name is encrypted based on a public key of a content producing device, wherein the original name is a hierarchically structured variable length identifier, wherein said hierarchically structured variable length identifier represents a location of a specific content object within a file system and is used to identify a specific content object;
   compute a masked name based on the original name;
   include the encrypted original name in a payload of an interest packet;
   in response to transmitting the interest packet with the masked name, receive a content object packet that includes the masked name, a nonce, and a payload including the content object corresponding to the original name, wherein the payload is encrypted based on a symmetric key to produce an encrypted payload, wherein the content object packet is generated by the content producing device;
   look up the masked name in a data structure stored at the client computing device to obtain the original name of the content object;
   compute the symmetric key based on both: (1) the original name of the content object obtained based on the masked name, and (2) the nonce, wherein the nonce is a random string with a length of a predetermined size, and wherein the symmetric key has a length that is equal to the predetermined size of the nonce; and
   decrypt the encrypted payload of the content object packet based on the symmetric key to produce a decrypted payload and to obtain the content object corresponding to the original name, thereby facilitating efficient and transparent content encryption between the client computing device and the content producing device.

14. The one or more non-transitory computer readable storage media of claim 13, wherein computing the masked name is further based on a hash function performed on one or more name components of the original name.

15. The one or more non-transitory computer readable storage media of claim 13, wherein the instructions are executed by an application associated with the client computing device or by a component of a stack of communication modules associated with the client computing device.

16. The one or more non-transitory computer readable storage media of claim 13, wherein the instructions further cause the processor to:
   set a name for the interest packet to the masked name; and
   store in a data structure stored at the client computing device a relation between the masked name and the original name.

17. The one or more non-transitory computer readable storage media of claim 13, wherein computing the symmetric key is further based on a key derivation function indicated in the content object packet.

18. The one or more non-transitory computer readable storage media of claim 13, wherein the instructions further cause the processor to:
   replace the masked name in the content object packet with the original name of the content object obtained based on the masked name;
   replace the encrypted payload in the content object packet with the decrypted payload; and
   remove from a pending interest table an entry corresponding to the original name of the content object obtained based on the masked name.

19. The one or more non-transitory computer readable storage media of claim 13, wherein the nonce is included in the payload of the content object packet.

20. The one or more non-transitory computer readable storage media of claim 13, wherein the nonce is included in a packet header of the content object packet.

* * * * *